May 14, 1968     A. SCHMITTER     3,382,942
PRECISION BALANCE WITH TARING DEVICE
Filed Feb. 24, 1966
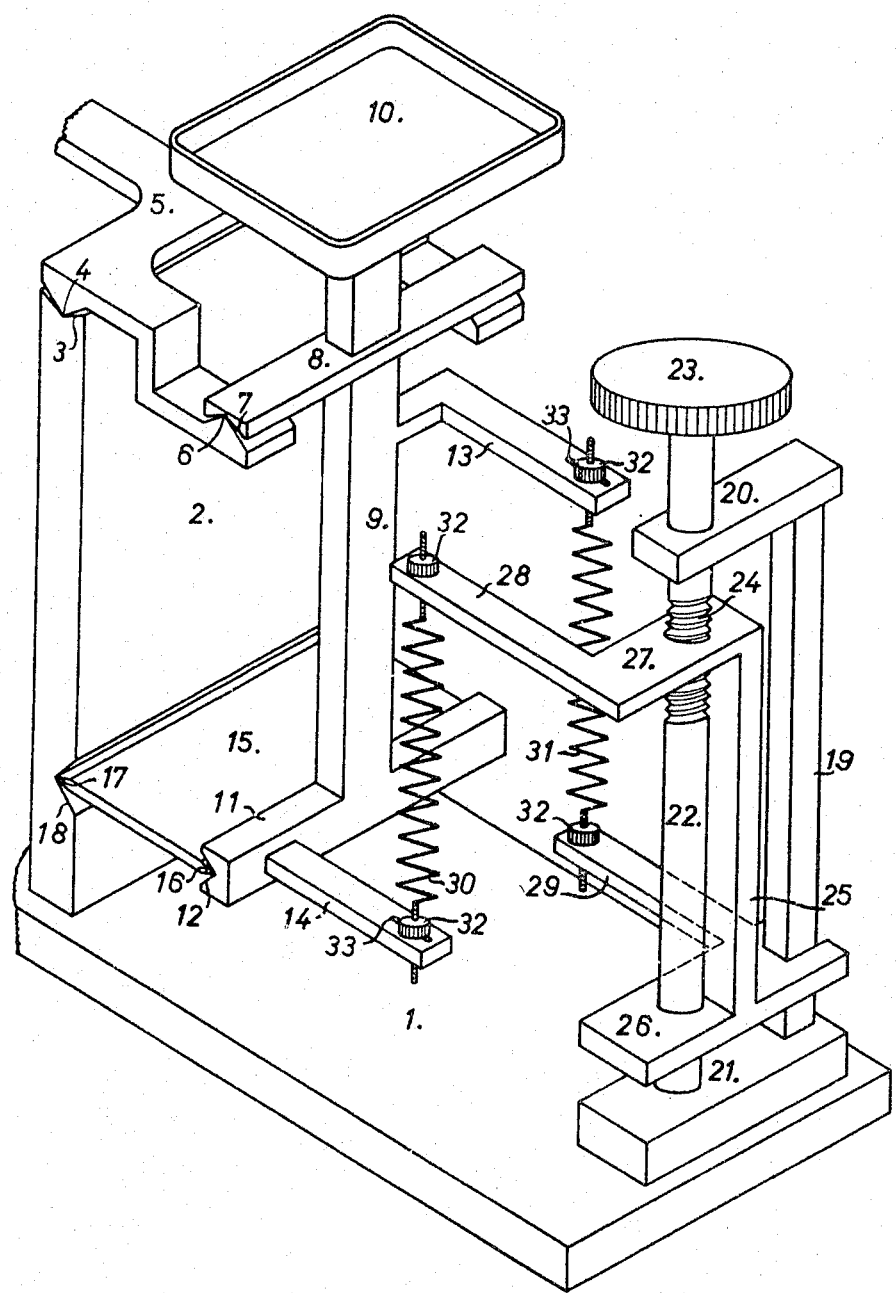
INVENTOR:
Albert Schmitter
BY:
Lawrence E. Laubscher
ATTORNEY

United States Patent Office 3,382,942
Patented May 14, 1968

3,382,942
PRECISION BALANCE WITH TARING DEVICE
Albert Schmitter, Feldbach, Switzerland, assignor to Mepag A.G., Zollikon, Switzerland, a corporation of Switzerland
Filed Feb. 24, 1966, Ser. No. 529,858
Claims priority, application Switzerland, Aug. 30, 1965, 12,136/65
4 Claims. (Cl. 177—170)

This invention relates to a precision balance with taring device.

In precision balances of conventional construction the beam, pivotally mounted on the frame of the balance, is provided with a counter weight on one arm. Suspended from the other arm is the pan carrier, which is provided with a pan and is guided by means of a steering lever extending between it and the frame of the balance. In order that differences in weight can be read off directly, and that the weight of containers used to hold the material can be compensated for, precision balances also have a built-in taring device. This usually comprises a tensioning member which is adjustable in relation to the frame of the balance and which adjusts the force exerted by a taring spring extending between the tensioning member and the pan carrier. A source of errors which undesirably alters the sensitivity of the balance is caused by the inevitable non-linearity of the spring force of the taring spring. Particularly with highly sensitive precision balances with a wide range of weighing, non-linearity of the taring spring already produces errors in the order of some tenths per thousand. Finally, another change in the sensitivity of the balance, again causing measuring errors, occurs when the balance is not exactly levelled. Such a change in sensitivity resulting from levelling errors appears to be considerably increased when the taring spring also has the aforementioned non-linearity.

The inadequacies of precision balances of the construction briefly outlined above can be largely avoided according to the invention by using a built-in taring device which comprises a plurality of tension springs connecting the pan carrier to the tensioning member in such a manner that in each position inside the normal adjusting range of said tensioning member one of said tension springs is urging said pan carrier downwards and another of said tension springs is urging said pan carrier upwards. Preferably, the tension spring urging the pan carrier downwards is acting between an upper portion of said pan carrier and a lower portion of said tensioning member, and said tension spring urging the pan carrier upwards is acting between a lower portion of the pan carrier and an upper portion of said tensioning member, and said two tension springs being helical and having substantially identical dimensions and properties. It has been found convenient to use a construction in which said tensioning member is vertically movable and in which said upper and lower portions for each of said springs are vertically aligned.

These and other objects and the advantages of the invention will best be understood from the following description of a specific embodiment when read in connection with the accompanying drawing which shows a perspective view, in simplified form, of a balance with taring device incorporating the invention. For clarity, any details not absolutely essential to an understanding of the invention have been omitted.

The frame of the balance comprises a base plate 1 and, rigidly fixed thereto, an upward extending plate-like column 2, the top end of which has a V-shaped abutment 3 to support a central knife edge 4 of a balance beam 5. Of the beam 5 the longer arm, usually provided with the counter-weight, is shown only fragmentarily. The shorter arm, provided with an outer knife edge 6 is of conventional construction. The pan carrier has a cross piece 8 provided with a V-shaped abutment 7 by means of which it is pivotally seated onto the knife edge 6 of the beam. The pan carrier also has a bar 9 rigidly connected to the cross piece 8 and, at the top, a scale pan 10. A further cross piece 11, also having a V-shaped abutment 12, is fixed to the bottom section of the bar 9. A protruding arm 13 is provided at the top portion of the bar 9, almost at the level of the cross piece 8. A further arm 14 is provided protruding from the cross piece 11. The two arms 13 and 14 are off-set laterally from one another.

A steering lever 15 is mounted to provide a parallel linkage for the pan carrier. One knife edge 16 of the steering lever rests in the V-shaped abutment 12 of the cross piece 11, while another, parallel, knife edge 17 is seated in a further V-shaped abutment 18 provided into the column 2.

The built-in taring device is also mounted on the frame of the balance. For this purpose an upright column 19, provided at the top with a transverse extension 20, is fitted in the base plate 1. Mounted on the base plate 1, with the column 19 extending through it, is a bearing block 21 in which a spindle 22 is rotatably seated although secured against axial displacement. The spindle 22 is supported in the extension 20, and has a knob 23 at its top. A screw-thread 24 provided in the upper portion of the spindle 22 is designed to adjust the level of the tensioning member of the taring device. The tensioning member substantially comprises a vertical support 25 provided at the bottom with a transverse member 26. The latter is mounted for vertical sliding movement along the cylindrical bottom portion of the spindle 22 and along the column 19. The top end 27 of the support 25 is bent horizontally and has an internal screw-thread which cooperates with the external thread 24 of the spindle 22. An extension 28 protrudes from portion 27 and ends vertically above the arm 14 of the pan carrier. An arm 29 protruding from the transverse member 26 ends vertically below the other arm 13 of the pan carrier. Extending between the arms 14 and 28 is a first tension spring 30 urging the pan carrier upwards. A second tension spring 31 extends between the arms 13 and 29 and accordingly endeavours to draw the pan carrier downwards. The ends of the springs 30 and 31 are provided with screw-threaded end pieces which are fixed to the appropriate arms with the aid of small nuts 32. Only the upper nut of each pair is visible in the drawing. Finally, in order that the tensile direction provided by the two springs 30 and 31 can be adjusted, the arms 13 and 14 have slots 33 extending in the direction of the balance beam 5 and thus perpendicular to the direction of the knife edges 4 and 6. In their dismantled relaxed state the taring springs 30 and 31 are helical springs identical in construction, material and size.

The whole arrangement is such that even when the tensioning member is in its lowest position, and the pan carrier is in its highest position, the spring 30 is just not quite fully relaxed. This corresponds to the zero position of the taring device and at the same time to the zero position of the beam 5 with the scale pan 10 unloaded. The other spring 31 must be just not quite fully relaxed when the tensioning member is in its highest position and the pan carrier is in its lowest one. To carry out a taring operation the tensioning member must be lifted out of its zero position by suitable rotation of the spindle 22. This reduces the tensile force of the spring 31 urging the pan carrier downwards, and at the same time increases the tensile force of the spring 30 drawing the pan carrier upwards.

The two springs 30 and 31 are thus always displaced in opposite directions but at the same amount and this has the effect that the even numbered terms, and especially the quadratic term, of the non-linear force components of the individual springs compensate for one another in the resultant total force exerted by both springs 30 and 31. Thus, the total force is virtually free from non-linearities and a displacement of the tensioning member of the taring device has practically no influence on the sensitivity of the balance. In addition to this and partly as a result of the aforesaid removal of non-linearity the sensitivity of the balance in respect of levelling errors is given improved constancy, so that when levelling errors occur only the zero point of the beam has to be reset. This greatly facilitates the practical handling of the balance.

I claim:
1. A precision balance with taring device, said balance having a balance frame, a balance beam fulcrumed on said balance frame, a pan carrier seated on a knife edge provided on one arm of said balance beam, and a steering lever acting between said balance frame and said pan carrier, and said taring device having a tensioning member movably mounted on said balance frame, means for adjusting the level of said tensioning member relative to said balance frame, and a plurality of tension springs connecting said pan carrier to said tensioning member in such a manner that in each level inside the normal adjusting range of said tensioning member one of said tension springs is urging said pan carrier downwards and another of said tension springs is urging said pan carrier upwards.

2. The invention as recited in claim 1, wherein said tension spring urging said pan carrier downwards is acting between an upper portion of said pan carrier and a lower portion of said tensioning member, and wherein said tension spring urging said pan carrier upwards is acting between an upper portion of said tensioning member and a lower portion of said pan carrier.

3. The invention as recited in claim 2, wherein said tensing springs are helical and have substantially identical dimensions and properties.

4. The invention as recited in claim 2, wherein said tensioning member is vertically movable and said upper and lower portions for each of said tension springs are vertically aligned.

References Cited

UNITED STATES PATENTS

| | | | |
|---|---|---|---|
| 1,172,458 | 2/1916 | Jaenichen | 177—170 |
| 3,193,030 | 7/1965 | Meier | 177—168 X |

FOREIGN PATENTS

| | | |
|---|---|---|
| 1,052,721 | 12/1966 | Great Britain. |

RICHARD B. WILKINSON, *Primary Examiner.*

G. H. MILLER, *Assistant Examiner.*